# United States Patent [19]

Nelson

[11] Patent Number: 4,749,510
[45] Date of Patent: Jun. 7, 1988

[54] PAINT STRIPPING COMPOSITION AND METHOD OF MAKING AND USING THE SAME

[75] Inventor: Henry J. Nelson, Grosse Pointe Woods, Mich.

[73] Assignee: Grow Group, Inc., Troy, Mich.

[21] Appl. No.: 851,804

[22] Filed: Apr. 14, 1986

[51] Int. Cl.$^4$ ............................................. C11D 7/52
[52] U.S. Cl. ...................... 252/166; 134/38;
  252/105; 252/143; 252/146; 252/151; 252/158;
  252/542; 252/548; 252/DIG. 8
[58] Field of Search ............. 134/38; 252/105, 143,
  252/146, 151, 158, 166, 542, 548, DIG. 8

[56] References Cited

U.S. PATENT DOCUMENTS

| | | | |
|---|---|---|---|
| 2,507,985 | 5/1950 | Kuentzel | 252/143 |
| 2,630,409 | 3/1953 | Bruner et al. | 252/105 |
| 4,120,810 | 10/1978 | Palmer | 252/153 |
| 4,276,186 | 6/1981 | Bakos et al. | 252/158 |

FOREIGN PATENT DOCUMENTS 857254  8/1981  U.S.S.R. .............................. 252/143

*Primary Examiner*—Robert Wax
*Attorney, Agent, or Firm*—Brooks & Kushman

[57] ABSTRACT

A paint stripper composition comprising a mixture of N-methyl-2-pyrrolidone and an aromatic, high flash hydrocarbon solvent applied to a painted surface for stripping paint. Accelerators useful in the mixture are an organic acid such as formic acid or an amine such as monoethanolamine. The paint stripper composition may also include an oil soluble surfactant to aid in wetting the surface of the object to be stripped. Also, a water soluble surfactant may be added to facilitate water rinsing the composition and loosened paint from the surface. The paint stripper may be thickened by addition of ethylcellulose to form a paint stripping composition having a thickness appropriate for immersion, spray, brush or knife application. The composition of the paint stripper may comprise from 20-90% by weight of N-methylpyrrolidone, 30-70% by weight 140° F. flash aromatic hydrocarbon solvent, 2-15% by weight formic acid, 0-3% by weight corrosion inhibitor, 0-5% by weight oil soluble nonionic surfactant and 2-6% by weight of water soluble nonionic surfactant and from 0-6% by weight of ethylcellulose. Instead of the acid and corrosion inhibitor, an amine may be added as an accelerator in the amount of 1 to 5% by weight. The preferred method of making the paint stripper composition includes vigorously mixing the aromatic solvent as the ethylcellulose is sifted slowly into the solvent. Then, N-methyl-2-pyrrolidone, the surfactants, and amine are added or, alternatively, the acid is added prior to adding the surfactants instead of the amine.

10 Claims, No Drawings`

PAINT STRIPPING COMPOSITION AND METHOD OF MAKING AND USING THE SAME

BACKGROUND OF THE INVENTION

Technical Field

The present invention relates to paint stripping composition used in a process where it is applied to a substrate coated with fully or partially cured paint. More specifically, the composition and methods relate to a non-chlorinated, low volatility paint stripper which is thickenable with ethylcellulose.

Brief Description of the Background Art

Methylene chloride paint strippers are currently the industry standard for paint stripper performance. Methylene chloride paint strippers are effective for quickly softening most types of paints. The speed at which methylene chloride performs is believed to be due to its high volatility as reflected by its extremely fast evaporation rate which shortens the work life of methylene chloride paint strippers. Frequently, when methylene chloride paint strippers are used on thick accumulations of paint, more than one application is required since the work life is insufficient to permit penetration through the accumulation of paint.

Methylene chloride is a chlorinated solvent which is closely regulated for environmental protection. Recently, it was discovered that methylene chloride can cause tumors in rats and mice. Since that discovery, the wide use of that solvent by industry and consumers has come under close scrutiny by federal regulatory agencies.

Paint strippers including methylene chloride can be formulated for use in various processes where the stripper is applied by immersion, brush, spray or otherwise to a substrate to be stripped. The stripper is applied and allowed to loosen paint on the substrate with an available work life of about three minutes. Attempts to extend the work life include addition of waxes to the mixture to retard evaporation. After the stripper has loosened the paint on the substrate, it may be rinsed with water or scraped from the substrate. Methylene chloride paint strippers must be handled carefully since they are highly toxic and can cause severe skin irritation. Also, a high volatility of methylene chloride paint strippers, especially those formulated with high volatile solvents such as toluene, result in high levels of hydrocarbon emissions and necessitate the provision of good ventilation to safely use the methylene chloride paint strippers.

The evaporation rate of a chemical is inversely relates to its vapor pressure and both are dependent upon temperature. The vapor pressure of methylene chloride at selected temperatures is provided in the following table:

TABLE I

| Temperature | Pressure |
| --- | --- |
| 20° C. | 349 mm Hg |
| 40° C. | 759 mm Hg |
| 60° C. | 1493 mm Hg |

Similarly, the evaporation rate of methylene chloride is 1.6 on a scale based on ether being 1.0, indicating that methylene chloride has an evaporation rate slightly slower than that of ether.

An important use of paint strippers is in cleaning industrial painting booths and equipment. The generally preferred process for stripping cured and partially cured paint accumulations found in industrial painting booths and equipment is to apply the paint stripper by spraying and water rinsing the booth walls and equipment. Paint can quickly accumulate on surfaces found in paint spray booths. This presents a significant problem for paint strippers which have a short work life such as methylene chloride paint strippers. The short work life of methylene chloride paint strippers prevents them from penetrating thick deposits of paint prior to evaporation of the volatiles in the stripper, causing it to dry out. If the methylene chloride paint stripper dries out before it can be washed off, an additional application of the paint stripper must be made to complete removal of the paint. Also, a second application may be required on thick deposits of paint because insufficient time is allowed for the methylene chloride stripper to penetrate the accumulated paint.

The preferred method for removing accumulated, dried paint from furniture and other woodwork is brush application followed by scraping with a blade and wiping with steel wool. A problem in the use of methylene chloride paint strippers is that more than one application may be required if the deposit of the paint includes several different types of paints. Also, due to the time required to scrape or wipe the loosened paint from the surface, only a small portion of an article to be stripped may be worked on at a time. Since the work life of the methylene chloride paint stripper is normally about three minutes, the portion of the article that can be stripped at one time is that portion which can be scraped in three minutes.

Unthickened paint strippers used in immersion stripping processes are unacceptable for removing paint from vertical surfaces because they tend to flow off the surface before the paint to be removed can be loosened. Paint strippers containing methylene chloride are generally thickened with methylcellulose. If a paint stripper is to thick, it may be used on vertical surfaces but it may not be easily applied by spray application equipment and would not be appropriate for use in paint spray booths. Depending upon the desired viscosity of the paint stripper and the compatibility of the paint stripper ingredients with the paint stripper thickening system, the entire paint stripper formulation may be required to be modified to perform optimally in each application.

In a general formulation for paint strippers, it is desirable to provide a method of adjusting viscosity that is appropriate for a given task without requiring modification of the active ingredients of the paint stripper.

SUMMARY OF THE INVENTION

In one aspect of the present invention, a paint stripper composition is provided which has the essential volatile constituents N-methyl-2-pyrrolidone (NMP) and a high flash (at least 110° F.) solvent wherein the paint stripper has a vapor pressure of between about 2 and 10 mm Hg. The volatiles of the paint stripper are non-chlorinated solvents and have a low evaporation rate. Ethylcellulose is another key constituent of the present invention when a thickened paint stripper is required. In the preferred composition the total by weight of volatiles ranges from 80% to 95%.

The paint stripper of the present invention, if intended for use in stripping mild steel which is water rinsed, includes an amine accelerator having a pH of between 8 and 12 and preferably between 9 and 11. The pH of the paint stripper may be measured by its slight solubility or miscibility in water. The provision of an amine accelerator, such as monoethanolamine (MEA), renders the paint stripper alkaline which prevents mild steel from flash rusting upon contact with water or humidity.

According to another aspect of the invention, a strong organic acid may be included as an accelerator to increase the stripping activity and attack particularly resistant types of paint. A suitable strong organic acid is formic acid but others such as oxalic acid, acetic acid, citric acid, gluconic acid, glutamic acid and the like may be substituted. If the paint stripper is acid, it is not recommended for use on mild steel wherein flash rusting can occur upon water rinsing. The pH of the paint stripper may be measured by its slight solubility or miscibility in water.

The composition may also include one or more surfactants to aid in wetting the surface of the object to be stripped and also to improve rinsability. The surfactant system preferably includes an oil soluble nonionic surfactant to improve the ability of the paint stripper to wet surfaces to be stripped. Also, a water soluble nonionic surfactant is preferably included to facilitate rinsing the paint stripper and loosened paint from the substrate.

A primary constituent in the paint stripper composition is N-methyl-2-pyrrolidone (NMP). The NMP chemically attacks the paint to be removed by dissolving or lifting the paint from the substrate. NMP has the chemical formula $C_5H_9NO$. It has an evaporation rate of 360.0 based upon a 1.0 ether scale and a vapor pressure of about 1 mm Hg at 40° C. NMP is an industrial solvent for natural and synthetic plastics, waxes, resins and various types of paints. NMP can dissolve polyethylene glycol, nylon, polyesters, polystyrene, polyacrylonitrile, polyvinyl chloride, polyvinyl acetate, cellulose derivatives, polyurethanes, polycarbonates and many copolymers. It is miscible with conventional organic solvents and water. NMP can be used in paints as a solvent. NMP is also a useful ingredient in methylene chloride-type paint removers and is known to have been used as an undiluted solvent for removing surface coatings.

Another primary constituent in the paint stripper composition of the present invention is the high flash solvent, preferably an aromatic hydrocarbon solvent having a flash point of more than 110° F. The solvent softens the lifted paint film and acts as an extender and a solublizer of the paint complementing the action of NMP. The most preferred solvent has a 140° F. flashpoint which reduces any fire hazard, increases the work life of the stripper and results from its low evaporation rate of 116.0 based on upon a 1.0 ether scale and a low vapor pressure of 5 mm Hg at 38° C. The reduced volatility of the solvent results in less hydrocarbon emissions and a longer work life of the stripper. The use of aromatic hydrocarbons is also preferred since aromatic hydrocarbons aid in dissolving paint. While it is possible to use other solvents such as toluene or xylene, the higher volatility of such substances increases evaporation and decreases work life. Also, more volatile solvents such as toluene have increased hydrocarbon emissions and related toxicity problems.

The paint stripping composition of the present invention may also include a strong organic reducing agent such as formic acid as an accelerator. Other organic acids soluble in aromatic hydrocarbon solvents without oxidation, such as acetic acid and oxalic acid, are anticipated to be substituents in the composition of the present invention. The use of an acid accelerator is particularly preferred for removing old accumulated paint layers from wood or other surfaces where corrosion inhibition is unnecessary. If an accelerator is needed and corrosion is a potential problem, a corrosion inhibitor may be used.

A suitable corrosion inhibitor is Alox 575, a petroleum sulfonate corrosion inhibitor available under that trade name from Alox Corporation. Alox 575 is an oxygenated hydrocarbon derived from the controlled, liquid phase, partial oxidation of petroleum fractions known for use as corrosion inhibitors. Other corrosion inhibitors that may be used include calcium sulphonate, sodium sulfonate, and magnesium sulfonate.

Alternatively, if the substrate to be stripped is adversely affected by an acidified system, such as mild steel which flash rusts after stripping with an acid paint stripper and water rinsing, the composition of the paint stripper preferably includes an amine accelerator instead of the organic acid so that the pH of the system is adjusted to between 9 and 11. Examples of acceptable amines are as follows:

diethanolamine
diethylethanolamine
diisopropylamine
ethylamine
ethylenediamine
isopropylamine
monoethanolamine (MEA)
monoisopropanolamine
morpholine
triethanolamine (TEA)
triethylenetetramine
triisopropynolamine A preferred embodiment of the present invention includes a two-part surfactant system. A first part of the surfactant system is an oil soluble nonionic surfactant nonylphenoxypoly-(ethyleneoxy)ethanol which aids in coating surfaces by wetting the surface of the painted object to be stripped. The second part of the surfactant system comprises a water soluble nonionic surfactant such as nonylphenoxy polyethoxyethanol which aids in rinsing the composition and loosen paint particles from the substrate.

According to another aspect of the invention, a process for removing paint from a substrate is provided. The process comprises coating dried or semi-dried paint on a substrate with a stripper consisting essentially of from 20-90% by weight NMP, 30-70% by weight high flash point aromatic hydrocarbon solvent, 2.5-9% nonionic surfactants, and 2-15% by weight strong organic acid or 1-5% by weight MEA. The stripper may be thickened to the appropriate consistency by adding ethylcellulose without changing the relative proportions of the other constituents of the paint stripper. The ethylcellulose may be added using the following table as a guide:

TABLE II

| % Ethylcellulose By Weight | Application | Viscosity at 77° F./ Consistency |
| --- | --- | --- |
| 0 | Immersion | 3.92 cp |
| 0.75 | Spray/Thin Paint Accumulation | Thin Syrup |
| 1.5 | Spray/Moderate Paint Accumulation | 20.6 cp |
| 3.0 | Spray/Thick Paint Accumulation | 104.0 cp |

TABLE II-continued

| % Ethylcellulose By Weight | Application | Viscosity at 77° F./ Consistency |
|---|---|---|
| 5.0 | Brush/Difficult Paint Removal | 372 cp |
| 8.0 | Brush-Blade/Difficult Paint Removal | Thin Paste |
| 10.0 | Blade/Confined Spot Removal | Thick Paste |

The process continues by softening the paint on the substrate as a result of the chemical action of the stripper. As a final step, the stripper and loosened paint are rinsed from the substrate with water or mechanically removed by scraping or wiping.

According to a further aspect of the present invention, a method of making a paint stripper is provided. The method of making a paint stripper according to the present invention comprises a first step of vigorously mixing in a vessel with a mechanical mixer ethylcellulose and the solvent. The ethylcellulose is slowly sifted over the surface so that that the ethylcellulose forms a gel. Then the NMP is added followed by the acid, oil soluble nonionic surfactant and water soluble nonionic surfactant or followed by the oil soluble surfactant, nonionic surfactant and amine.

Based upon extensive experimentation with a considerable number of possible compositions, Applicant has isolated certain formulations which have satisfactory characteristics for removing paint with different application techniques, on different substrates and with different quantities of accumulated paint, etc. According to the present invention, a highly effective paint stripper is provided which has a long work life, low toxicity and low volatility. The paint stripper is effective at removing most paint compositions in any degree of accumulation without the necessity of reapplying the stripper to achieve complete stripping.

DESCRIPTION OF THE PREFERRED EMBODIMENTS

The compositions which are preferred to be used in this invention for stripping dried and partially dried paint are set forth on the two following tables:

TABLE III

| Constituent | Broad Range by Weight % | Preferred Range by Weight % |
|---|---|---|
| N—methylpyrrolidine | 20-90% | 30-50% |
| Aromatic hydrocarbon | 30-70% | 30-60% |
| Amine | 1-5% | 3-5% |
| Oil soluble nonionic surfactant | 0.5-3% | 1-2% |
| Water soluble nonionic surfactant | 2-6% | 3-5% |
| Ethylcellulose | 0-10% | 0.75-4.5% |

TABLE IV

| Constituent | Broad Range by Weight % | Preferred Range by Weight % |
|---|---|---|
| N—methylpyrrolidine | 20-90% | 30-50% |
| Aromatic hydrocarbon | 30-70% | 30-60% |
| Organic Acid | 1-15% | 4-9% |
| Oil soluble nonionic surfactant | 0.5-3% | 1-2% |
| Water soluble nonionic surfactant | 2-6% | 3-5% |
| Ethylcellulose | 0-10% | 0.75-4.5% |

Referring to Tables III and IV, the following relationships between the constituents have been noted and represented preferred ranges. The total volatile content as constituted by the NMP and aromatic hydrocarbon ranges between 80 and 95% by weight. The range of surfactants in total ranges between 3 and 6% by weight. The combined total content of ethylcellulose and aromatic hydrocarbon solvent ranges between 30 and 80% by weight. Also, the pH of the amine stripper of Table III is between about 10.5 and 11 and the pH of the acid stripper of Table IV is about 3.

As used herein all references to percents shall be construed as percent by weight.

As used herein "nominal composition" refers to a preferred composition for a particular application. As will be understood, the nominal composition includes a range for each constituent depending upon the application, commercial practice methods of formulation, concentration, etc. For instance, the examples above the NMP and petroleum distillate may range about plus or minus 5%, the formic acid, petroleum sulfonate, and nonylphenoxy polyethoxyethanol may range plus or minus 2%, the amine and nonylphenoxypoly-(ethyleneoxy)ethanol may range plus or minus 1%.

As set forth above the viscosity will depend upon the percentage of ethylcellulose and the nominal percentage will depend upon the particular application.

In practicing the present invention, it has been found that the preferred nominal composition for removing by immersion, difficult to remove coatings from various substrates comprises the following, by weight:
1. 42% N-methylpyrrolidone;
2. 42% 140° F. flash point aromatic petroleum distillate;
3. 9% by weight of formic acid;
4. 1% nonylphenoxypoly-(ethyleneoxy)ethanol;
5. 3% nonylphenoxy polyethoxyethanol; and
6. 3% petroleum sulfonate corrosion inhibitor.
Wherein the composition has a pH of about 3.

The preferred nominal composition for removing coatings from wood, non ferrous substrates and paint spray booths and equipment wherein mild steel can flash rust when it is exposed to humidity thereafter comprises the following, by weight:
1. 45% N-methylpyrrolidone;
2. 45% 140° F. flash point aromatic petroleum distillate;
3. 5% monoethanolamine;
4. 1% nonylphenoxypoly-(ethyleneoxy)ethanol;
5. 3% nonylphenoxy polyethoxyethanol; and
6. From 0-5% ethylcellulose.
Wherein the composition has a pH of between 10.5 and 11.

A key constituent in the paint composition of the present invention is N-methylpyrrolidone (NMP). NMP is a cyclic amide having a fashpoint of 199° F. (PM/CC)/204° F. (OC). The chemical formula for NMP is $C_5H_9NO$ and its chemical structure is as follows.

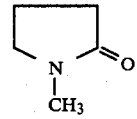

While the preferred range of NMP is between 30 and 50%, the best quantity is about 45%.

The secondary solvent and vehicle for both application of the paint stripper composition and for maintaining the loosened paint particles in a suspension is an aromatic hydrocarbon solvent of the petroleum distillate type. Preferably the aromatic hydrocarbon solvent has a high flashpoint of at least 110° F. The preferred aromatic hydrocarbon solvent is sold by Ashland Chemical Company under the trademark Hi Sol 15 and has a flashpoint of 140° F. However other aromatic hydrocarbon solvents could be substituted such as xylene, toluene, methyl ethyl ketone, and the like but the use of which solvents would adversely affect the volatility work life and toxicity of the stripper. The solvent is preferably provided in the amount of 30–60% by weight and most preferably as provided in the amount equal to the NMP or about 44% by weight.

The organic acid used in one preferred embodiment of the present composition is formic acid, a strong reducing agent. Other organic acids may also be used that are soluble in aromatic hydrocarbons without oxidizing. Mineral acids are inappropriate for use with aromatic hydrocarbons and N-methylpyrrolidone since most mineral acids are expected to oxidize creating a fire hazard. If formic acid is the acid selected, the preferred range is from 8–9% a formic acid of the 90% technical grade and a most preferred quantity is about 9%. Other organic acids which could be used in the present invention include: acetic acid, citric acid, oxalic acid, gluconic acid, and glutamic acid. The organic acid preferably adjusts the acidity of the stripper to a pH of about 3.

The amine used in the other preferred embodiment is monoethanolamine (MEA), a slightly alkaline (pH 10.5–11) amino alcohol which modifies the pH of the stripper and also functions as a solvent. Other amines such as triethanolamine (TEA) may be used provided they are compatible with the NMP, aromatic petroleum distillate and ethylcellulose if the stripper is thickened. If MEA is selected, the preferred range is 1–6% and the best quantity is about 5%.

The oil soluble nonionic surfactant is preferably nonylphenoxy poly-(ethyleneoxy)ethanol which is available from GAF under the trade name Igepal c0-210 and is selected for its compatibility with the other constituents. It is important that the oil soluble nonionic surfactant not precipitate from the composition. The broad range of oil soluble nonionic surfactant is from 0.5% to 3% and the best quantity is about 1%.

The nonionic water soluble surfactant is preferably nonylphenoxy polyethoxyethanol which is identified by the trade name Polytergent B-300 and is available from Olin Chemical Co. The water soluble nonionic surfactant is provided to aid in rinsing the paint stripper from the surface after the paint has been loosened by the action of the stripper. The water soluble nonionic surfactant is preferably provided in the amount of from 3–5% by weight and the best combination includes about 3% of the water soluble nonionic surfactant. The water soluble nonionic surfactant could be any water soluble nonionic surfactant provided that it does not precipitate from the composition.

The thickener used in the present invention is sold under Dow Chemical Company's trademark Ethocel. The preferred grade is Standard 100. Industrial Ethylcellulose which may include more than 1% by weight of water. The quantity of Ethocel may be varied from 0 to 10% by weight to yield different viscosity or consistency paint strippers as set forth above in Table II.

It is anticipated that an anionic surfactant system could be used. However, it would not be preferred since it could cause unintended reactions. The use of cationic surfactants is not preferred since they would pose solubility problems.

PREPARATION OF THE COMPOSITION

Mixing the constituents together can be done by blending with a mechanical mixer in a tank or other similar vessel. The composition of this invention is prepared by first vigorously mixing the aromatic hydrocarbon solvent as the ethylcellulose is sifted over the surface of the solvent forming a fine uniform miscible mixture forming a gel. The ethylcellulose is added extremely slowly to permit the ethylcellulose to dissolve without forming a precipitate or large agglomerations. The extremely slow rate of addition of ethylcellulose to the mixture is required due to the relative incompatibility of ethylcellulose. If the ethylcellulose is added too quickly, a precipitate or agglomerations will form and the ethylcellulose will not function as a thickening agent for the paint stripper.

Next, the NMP is added to the aromatic hydrocarbon and ethylcellulose. If the formic acid is used it is then mixed in followed by the oil soluble surfactant and the water soluble surfactant. If the MEA is used as an accelerator, it is added after the surfactants and the formic acid is not added.

APPLICATION OF THE COMPOSITION

The composition of this invention is used, preferably undiluted, in a process for removing paint from a substrate. The composition may be applied to the paint coated substrate by spraying, brushing, troweling or otherwise. The paint on the substrate is then softened by reaction with the N-methylpyrrolidone, the pH modifier, and the aromatic hydrocarbon solvent and is held in suspension on the surface by the thickener, if present. After the paint on the substrate is softened, the stripper and loosened paint may be rinsed from the substrate with water or manually scraped or sanded from the substrate. The paint stripper normally requires about 5–20 minutes to soften the paint on the substrate. The long work life permits complete removal from the substrate with a single application, regardless of the thickness of the paint accumulation, in most instances, since the stripper can be left on until all the paint is loosened. This is a significant advantage realized by the present invention as compared to methylene chloride paint strippers.

The paints upon which the paint stripper of the present invention is effective include those conventionally used as automotive finishes and primers, metal enamels, lacquers, varnishes, polymer paints and others used in industrial processes and also general purpose household paints and surface coatings.

In order to further illustrate this invention, the following examples are presented.

EXAMPLE I

Following the procedure set forth above under the heading "PREPARATION OF THE COMPOSITION" the following constituents were combined:

| Constituent | % by Weight |
| --- | --- |
| NMP | 44% |
| Hi-Sol 15 | 44% |
| Igepal C0-210 | 1% |
| Polytergent B-300 | 3% |
| MEA | 5% |
| Ethylcellulose | 3% |

The resultant paint stripper was a sprayable but thick mixture having a pH of between 10.5 and 11. The thickness of the paint stripper was appropriate for use in a paint spray booth wherein a mild steel substrate was cleaned by spray application of the paint stripper and water washing. The time required to completely strip the cured and partially cured paint from the walls of the paint spray booth was about 20 minutes and only a single application was required. The paint on the surface of the paint spray booth was dissolved and lifted off the substrate.

EXAMPLE II

To a vessel equipped with a mechanical mixer, 36% by weight NMP, 50% by weight Hi-Sol 15 and 10% by weight formic acid were added and mixed gently. Then, 2% by weight of Igepal c0-210 and 2% by weight Polytergent B-300 were added and the entire mixture was vigorously mixed.

The resultant paint stripper was a thin mixture having a viscosity at 77° F. of 3.9 centipoise. The paint stripper was tested in an immersion tank on small mild steel parts which were immersed until the paint was removed from the parts. After immersing, the parts were rinsed in cold water and flash rusting occurred on the parts due to the low pH of the stripper. The paint stripper was extremely effective and quick in removing paint from the substrate.

EXAMPLE III

A low flashpoint paint stripper was prepared by combining 36% by weight NMP with 47.25% by weight xylene, 9% by weight formic acid, and mixed with a mechanical mixer. To the initial mixture, 2% by weight of Igepal c0-210 and 5% by weight Polytergent B-300 were added by vigorously mixing and 0.75% by weight of ethylcellulose was slowly added.

The above mixing procedure resulted in an excessively long mixing time of about three hours. However, the resultant paint stripper was an acceptable, slightly thickened paint stripper suitable for use in production paint removal operations wherein a high flashpoint is not required and it is desirable to reduce the cost of the paint stripper. The paint stripping effectiveness was very good. If the paint stripper of this example is used on mild steel parts, flash rusting would occur unless a rust inhibitor were added to the mixture.

EXAMPLE IV

Following the procedure described in Example II above, the following constituents were combined:

| Constituent | % by Weight |
| --- | --- |
| NMP | 35.5% |
| Hi-Sol 15 | 48% |
| Formic Acid | 9% |
| Igepal C0-210 | 1% |
| Polytergent B-300 | 5% |
| Ethocel | 1.5% |

The resultant paint stripper had the approximate consistency of a light syrup, or more particularly, a viscosity at 77° F. of 20.6 centipoise. The thickness of the paint stripper was appropriate for production removal of uncured paints including high solids enamel paints from conveyors and other apparatus used in production painting operations. The slight thickening of the paint stripper permits the stripper to be used on vertical surfaces since the thickness increases the duration of time that the stripper remains on the paint to be stripped but the thickness is not sufficient to interfere with spray application which is preferred for production equipment paint removal.

EXAMPLE V

Following the procedure described in Example II above, the following constituents were combined:

| Constituent | % by Weight |
| --- | --- |
| NMP | 35.5% |
| Hi-Sol 15 | 46.5% |
| Ethocel | 3% |
| Formic Acid | 9% |
| Igepal C0-210 | 1% |
| Polytergent B-300 | 5% |

The resultant paint stipper was thickened to the approximate consistency of a thick syrup and had a viscosity at 77° F. of 104 centipoise. The paint stripper was the appropriate consistency for spray application on walls and other surfaces of paint spray booths wherein longer working time due to the accumulated paint deposit which increased the time required for stripping.

EXAMPLE VI

Following the procedure described in Example II above, the following constituents were combined:

| Constituent | % by Weight |
| --- | --- |
| NMP | 35.5% |
| Hi-Sol 15 | 46% |
| Ethocel | 4.5% |
| Formic Acid | 8% |
| Igepal C0-210 | 1% |
| Polytergent B-300 | 5% |

The resultant paint stripper was an extremely thick consistency, roughly equivalent to that of heavy motor oil and more particularly had a viscosity at 77° F. of 372 centipoise. The thickness of the paint stripper made it appropriate for brush application but inappropriate for spray application. This consistency would be preferable for manually stripping the small parts of machinery and for consumer use in refinishing furniture where it is preferred to scrape off the residue consisting of the paint stripper and loosened paint.

EXAMPLE VII-XIII

The following examples are presented to illustrate the anticipated range of proportions and test results for an amine non-rusting formulation thickened to various degrees. All stated quantities are in percent by weight.

| Constituent | Ex. 7 | Ex. 8 | Ex. 9 | Ex. 10 | Ex. 11 | Ex. 12 |
| --- | --- | --- | --- | --- | --- | --- |
| NMP | 50.0 | 30.0 | 60.0 | 40.0 | 20.0 | 70.0 |
| Hi-Sol 15 | 45.0 | 59.5 | 29.5 | 48.0 | 66.0 | 13.0 |
| Igepal C0-210 | 1.0 | 1.0 | 1.0 | 1.0 | 1.0 | 1.0 |
| Polytergent B-300 | 3.0 | 3.0 | 3.0 | 3.0 | 3.0 | 3.0 |
| MEA | 1.0 | 5.0 | 5.0 | 5.0 | 5.0 | 5.0 |
| Ethocel | 0.0 | 1.5 | 1.5 | 3.0 | 5.0 | 8.0 |

Example VII was an excellent stripper having a thin consistency. Example VIII was a paint stripper having good effectiveness and good sprayability since it was a slightly thickened composition. Example IX is excellent in removing paint and is a slightly thickened consistency. Example X had excellent results in stripping paint and was very thick yet sprayable. Example XI was moderately effectively in stripping paint and had a thick semi-paste consistency which would be in appropriate for spray application but applicable by a brush. Example XII is an extremely thick and extremely effective paint stripping composition. The thickness of the composition of Example XII would preclude application by spray or brush and require spreading with a trowel or knife and would be only useful in certain specialized applications.

| Constituent | Ex. 13 | Ex. 14 | Ex. 15 | Ex. 16 | Ex. 17 | Ex. 18 |
|---|---|---|---|---|---|---|
| NMP | 20.0 | 70.0 | 40.0 | 30.0 | 50.0 | 40.0 |
| Hi-Sol 15 | 65.0 | 15.0 | 43.5 | 52.0 | 30.0 | 37.0 |
| Formic Acid | 8.0 | 8.0 | 8.0 | 8.0 | 8.0 | 8.0 |
| Igepal CO-210 | 2.0 | 2.0 | 1.0 | 1.0 | 1.0 | 1.0 |
| Polytergent B-300 | 2.0 | 2.0 | 3.0 | 3.0 | 3.0 | 3.0 |
| Alox 575 (Petroleum Sulfonate) | 3.0 | 3.0 | 3.0 | 3.0 | 3.0 | 3.0 |
| Ethocel | 0.0 | 0.0 | 1.5 | 3.0 | 5.0 | 8.0 |

The expected test results of the above compositions are as follows. Example XIII would be a moderately effective paint stripper that was not thickened. The inclusion of Alox 575, would be helpful in reducing the tendency of the paint stripper to cause flash rusting on mild steel. However, even with this quantity of Alox 575, some rusting could be anticipated on mild steel although it would be retarded significantly. Sample XIV would provide an excellent paint stripper in terms of effectiveness that was unthickened and suitable for immersion stripping. However, the high quantity of NMP at its current unit cost would make the composition very expensive compared to competitive stripping compositions. Example XV would provide an excellent stripper moderately thickened and suitable for spray application. Example XVI would provide a very good paint stripper of a very thick consistency. Example XVII would be an excellent paint stripper of a thick, semi-paste consistency that could be applied by a brush. Example XVIII would be an excellent paint stripper having a paste consistency that would be applied by a knife or trowel.

It is apparent that there has been provided in accordance with the invention a paint stripper composition and a method of making and using the same. It will be readily appreciated that the composition and method of the present invention overcome the disadvantages associated with the prior art methylene chloride-based paint strippers. While the invention is described in conjunction with several specific embodiments, it is evident that many alternatives, modifications, and variations of the invention will be apparent in light of the foregoing description. Accordingly, it is intended to embrace all such alternatives, modifications, and variations as fall within the spirit and broad scope of the appended claims.

I claim:

1. A non-chlorinated paint stripping composition having low volatility, said paint stripping composition consisting essentially of from about 20% by weight to about 90% by weight N-methyl-2-pyrrolidone, from about 30% by weight to about 70% by weight aromatic hydrocarbon solvent, said aromatic hydrocarbon solvent having a flash point greater than 110° F., and from about 1% by weight to about 15% by weight organic acid selected from the group consisting of glutamic acid, gluconic acid, citric acid, acetic acid, oxalic acid, and forming acid and combinations thereof.

2. A non-chlorinated paint stripping composition having low volatility, said paint stripping composition consisting essentially of from about 20% by weight to about 90% by weight N-methyl-2-pyrrolidone, from about 30% by weight to about 70% by weight aromatic hydrocarbon solvent, said aromatic hydrocarbon solvent having a flash point greater than 110° F., and from about 1% by weight to about 15% by weight glutamic acid.

3. A non-chlorinated paint stripping composition having low volatility, said paint stripping composition consisting essentially of from about 20% by weight to about 90% by weight N-methyl-2-pyrrolidone, from about 30% by weight to about 70% by weight aromatic hydrocarbon solvent, said aromatic hydrocarbon solvent having a flash point greater than 110° F., and from about 1% by weight to about 15% by weight gluconic acid.

4. A non-chlorinated paint stripping composition having low volatility, said paint stripping composition consisting essentially of from about 20% by weight to about 90% by weight N-methyl-2-pyrrolidone, from about 30% by weight to about 70% by weight aromatic hydrocarbon solvent, said aromatic hydrocarbon having a flash point greater than 110° F., and from about 1% by weight to about 15% by weight citric acid.

5. The non-chlorinated paint stripping composition having low volatility recited in claim 1, further consisting essentially of from about 0.5% by weight to about 3% by weight oil-soluble nonionic surfactant, from about 2% by weight to about 6% by weight water-soluble nonionic surfactant and up to about 10% by weight ethylcellulose.

6. The non-chlorinated paint stripping composition having low volatility recited in claim 2, further consisting essentially of from about 0.5% by weight to about 3% by weight oil-soluble nonionic surfactant, from about 2% by weight to about 6% by weight water-soluble nonionic surfactant and up to about 10% by weight ethylcellulose.

7. The non-chlorinated paint stripping composition having low volatility recited in claim 3, further consisting essentially of from about 0.5% by weight to about 3% by weight oil-soluble nonionic surfactant, from about 2% by weight to about 6% by weight water-soluble nonionic surfactant and up to about 10% by weight ethylcellulose.

8. The composition of claim 1 wherein the acid is acetic acid.

9. The composition of claim 1 wherein the acid is oxalic.

10. The composition of claim 1 wherein the acid is formic acid.

* * * * *

UNITED STATES PATENT AND TRADEMARK OFFICE
CERTIFICATE OF CORRECTION

PATENT NO. : 4,749,510

DATED : June 7, 1988

INVENTOR(S) : Henry J. Nelson

It is certified that error appears in the above-identified patent and that said Letters Patent is hereby corrected as shown below:

In the Claims:

In Claim 1, column 12, line 9, delete the word "forming" and substitute the word ---formic--- therein.

Signed and Sealed this

Twenty-eighth Day of February, 1989

Attest:

DONALD J. QUIGG

Attesting Officer

Commissioner of Patents and Trademarks